United States Patent
Hamaguchi et al.

(10) Patent No.: US 7,099,097 B2
(45) Date of Patent: Aug. 29, 2006

(54) THERMALLY ASSISTED MAGNETIC RECORDING METHOD

(75) Inventors: Shingo Hamaguchi, Kawasaki (JP); Kazuyuki Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/068,359

(22) Filed: Feb. 28, 2005

(65) Prior Publication Data
US 2006/0114590 A1    Jun. 1, 2006

(30) Foreign Application Priority Data
Nov. 26, 2004    (JP) ............................. 2004-341805

(51) Int. Cl.
*G11B 5/02*    (2006.01)

(52) U.S. Cl. ..................... 360/59; 369/13.14

(58) Field of Classification Search ............. None
See application file for complete search history.

(56) References Cited

U.S. PATENT DOCUMENTS

2005/0122612 A1*    6/2005    Albrecht et al. ............. 360/59
2005/0146992 A1*    7/2005    Inomata et al. ............. 369/13.02

FOREIGN PATENT DOCUMENTS

| JP | 6-243527 | 9/1994 |
| JP | 2003-157502 | 5/2003 |

* cited by examiner

*Primary Examiner*—Andrew L. Sniezek
(74) *Attorney, Agent, or Firm*—Greer, Burns & Crain, Ltd.

(57) ABSTRACT

A thermally assisted magnetic recording method is implemented for a storage disk with a magnetic recording layer which includes recording areas and non-recording areas. In this method, a heating laser is moved relative to the disk in facing relation to the magnetic recording layer for locally heating the recording areas. As the laser spot transitions from a recording area to the subsequent non-recording area, the heating is stopped. In cooperation with the heating laser, a magnetic field applier locally magnetizes the recording areas of the magnetic recording layer for recording signals. As the magnetic field applier transitions from a recording area to the subsequent non-recording area, the application of the magnetic field is stopped after the heating by the heating laser is stopped.

3 Claims, 4 Drawing Sheets

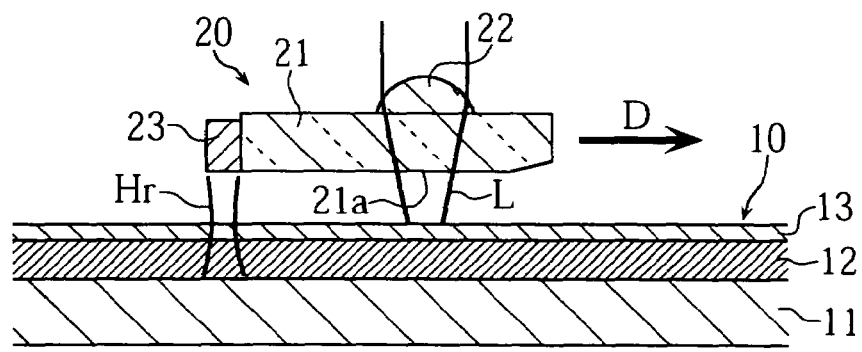
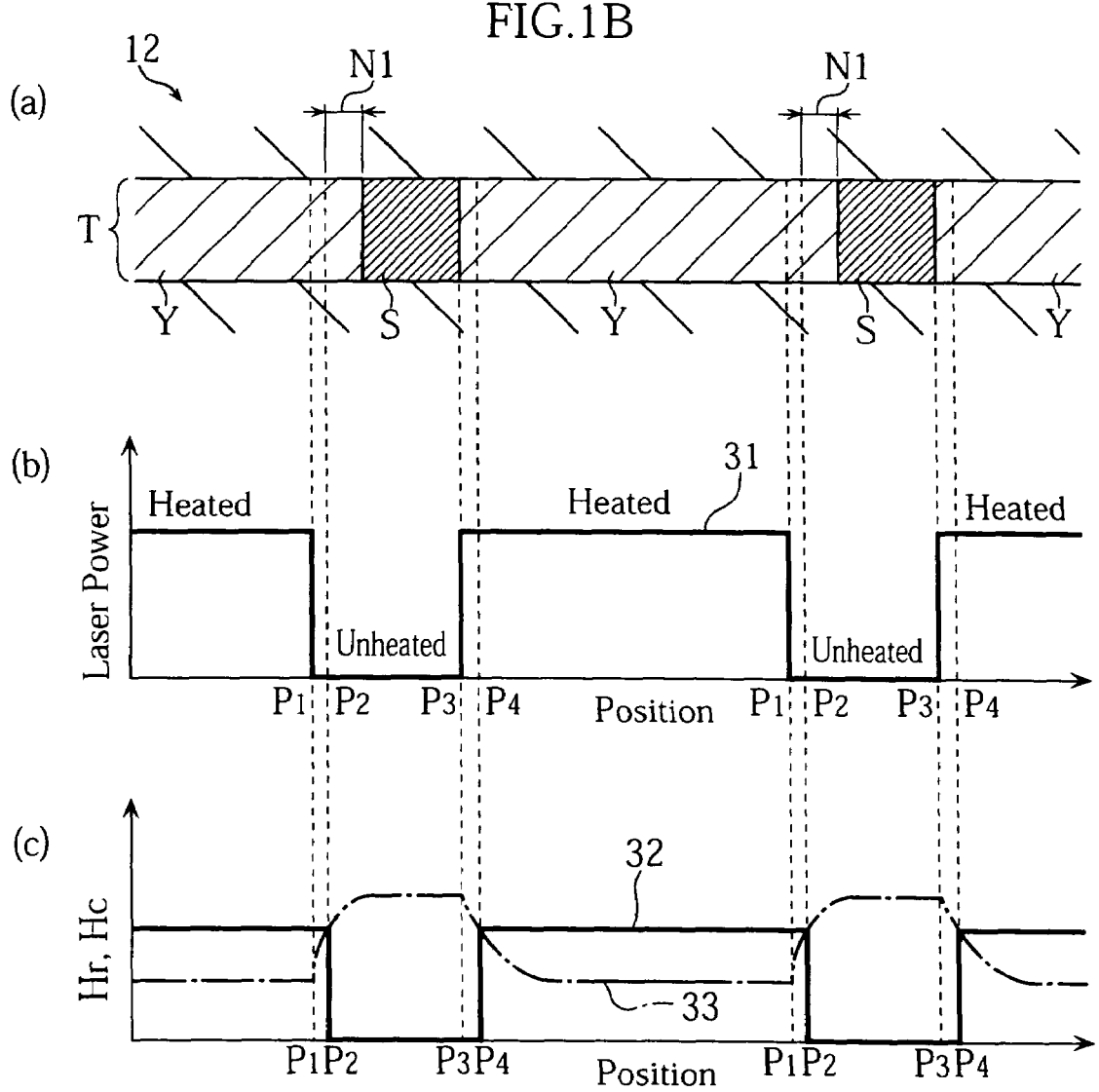

THERMALLY ASSISTED MAGNETIC RECORDING METHOD

BACKGROUND OF THE INVENTION

1. Field of the Invention

The present invention relates to a thermally assisted magnetic recording method for implementing heat-assisted information recording on a magnetic recording medium.

2. Description of the Related Art

Magnetic recording media (magnetic disks) are known as recording media for constituting recording devices such as hard disks. The increase in the information processing volume in computer systems creates a growing demand for magnetic disks with increased recording density.

When information is recorded on a magnetic disk, a magnetic head for recording is disposed close to a recording magnetic film of the magnetic disk, and a recording magnetic field with an intensity higher than the coercive force of the recording magnetic film is applied to the recording magnetic film with the magnetic head. When the direction of the recording magnetic field from the magnetic head is successively inverted, while the magnetic head is moved with respect to the magnetic disk, a plurality of magnetic domains with successively inverted magnetization direction are formed in a row in the circumferential direction or in the track extension direction of the magnetic disk. The prescribed signals or information are thus recorded as changes in the magnetization direction in the recording magnetic film.

In the technological field of magnetic disks, it is well known that the higher is the coercive force of the recording magnetic film, the higher is the thermal stability of magnetic domains formed in the recording magnetic film and the easier is the formation of stable magnetic domains of a very small size or width. The smaller are the smallest magnetic domains that can be formed with good stability in the recording magnetic film, the higher is the recording density that can be obtained in the magnetic disk.

In information recording on magnetic disks, as mentioned above, signal magnetic domains cannot be adequately formed unless the recording magnetic field applied to the recording magnetic film is higher than the coercive force. For this reason, the intensity of the recording magnetic field applied by the magnetic head apparently has to be increased with the increase in the coercive force that is set for the recording magnetic film. However, the intensity of the recording magnetic field that can be applied by the magnetic head is limited, for example, from the standpoint of magnetic head structure or power consumption.

Accordingly, a thermally assisted magnetic recording method is sometimes used for information recording on the magnetic disks. When information recording on magnetic disks is implemented with the thermally assisted magnetic recording method, first, the temperature of the recording magnetic film of the magnetic disk is locally and successively raised by conducting laser beam illumination from the prescribed optical head. In the area with the raised temperature in the recording magnetic film, the coercive force decreases with respect to that in the surrounding areas where the temperature has not been increased. Then, a recording magnetic field that is stronger than the coercive force in the area of the recording magnetic field with the increased temperature is applied to the area with increased temperature by the magnetic head, and part of the area with increased temperature is magnetized in the prescribed direction. This magnetization is fixed in the process of cooling the magnetized zone. If the thermally assisted magnetic recording method is used, information recording is implemented by applying the recording magnetic field to the zones in which the coercive force is decreased by heating. Therefore, even when the coercive force of a recording magnetic film at a normal temperature during information storage or information reproduction is set at a high level, it is not necessary to increase excessively the intensity of the recording magnetic field that has to be applied with the magnetic head. Such a thermally assisted magnetic recording method is described, for example, in Japanese Patent Applications Laid-open No. H6-243527 and 2003-157502.

On the other hand, when a plurality of concentric circular tracks are magnetically constituted in the recording surface (recording magnetic film) of a magnetic disk, the user data areas and servo pattern areas are arranged alternately in each track in the extension direction thereof (that is, the circumferential direction of the magnetic disk). The user data areas are the zones where the user data can be rewritably recorded with the magnetic head of the magnetic disk device. The servo pattern areas are the areas for magnetically forming or recording the prescribed servo patterns for positioning and controlling he magnetic head on the target rack on the recording surface. During information recording on a magnetic disk, the user data are recorded in the user data areas, but the servo pattern located in the servo pattern areas is not rewritten.

FIGS. 4A and 4B show an example of the conventional thermally assisted magnetic recording method. FIG. 4A shows a partial cross-section of a magnetic disk 40 rotated during information recording and a slider 50 disposed opposite the magnetic disk. The magnetic disk 40 has a laminated structure comprising a disk substrate 41, a recording magnetic film 42, and a protective layer 43 and is composed as a magnetic recording medium capable of implementing information recording (magnetic recording) and information reproduction in a thermally assisted recording system. The slider 50 comprises a slider body 51, a converging lens 52, and a magnetic head 53 for recording. The slider body 51 comprises a prescribed laser emission section 51a on the side thereof facing the medium. A laser beam L that is emitted from a light source (not shown in the figures) and passed through the converging lens 52 can be emitted from the laser emission section 51a. The converging lens 52 is used to converge the laser beam L. The magnetic head 53 serves to apply the prescribed recording magnetic field Hr to the recording magnetic film 42. The movement direction of the slider 50 with respect to the rotating magnetic disk 40 is shown by arrow D.

FIG. 4B-(a) is a partial enlarged plan view of one track T in the recording magnetic film 42 and vicinity thereof (the scale in this figure is different from that in FIG. 4A). In the track T, the user data areas Y and servo pattern areas S are arranged alternately in the extension direction of the stack. FIG. 4B-(b) is a graph illustrating the control mode of laser illumination in the present conventional method. In the graph shown in FIG. 4B-(b), the position on the recording magnetic film 42 or track T (position in the track extension direction) that is opposite the laser beam emission section 51a located directly below the converging lens 22 is plotted against the abscissa, and the laser power is plotted against the ordinate. The laser power corresponding to the position in the track extension direction of the laser beam L illuminated on the recording magnetic film 42 is represented by a solid line 61. FIG. 4B-(c) is a graph showing the control mode of recording magnetic field application and the changes in the coercive force of the recording magnetic film 42 in the present conventional method. In the graph shown in FIG. 4B-(c), the position on the recording magnetic film 42 or track T that is opposite the magnetic head 53 (position in the track extension direction) is plotted against the abscissa, and the absolute value of the intensity of the recording magnetic field Hr and the coercive force Hc of the recording magnetic film 42 are plotted against the ordinate. The absolute value of the intensity corresponding to the position in the track extension direction is shown with a solid line 62 for the recording magnetic field Hr applied to the recording magnetic film 42 (therefore, the application direction of the recording magnetic field Hr is not represented by the solid line 62). Furthermore, the coercive force Hc of the recording magnetic film 42 at the time the magnetic head 53 passes by is represented by a dash-dot line 63.

In the conventional thermally assisted magnetic recording method shown in FIGS. 4A–4B, the prescribed user data are written by laser beam illumination and recording magnetic field application in the user data areas Y successively facing the slider 50 in a state (that is, in a state in which the magnetic disk 40 is rotated in the direction opposite that of arrow D after the slider 50 has been disposed opposite the recording magnetic film 42) in which the slider 50 is moved in the direction shown by arrow D with respect to the recording magnetic film 42, and the laser beam illumination and recording magnetic field application are stopped at the prescribed timing so that the servo pattern magnetically formed in the servo pattern areas S successively facing the slider 50 does not change.

When the user data are written into the user data areas Y (during information recording), the recording magnetic film 42 is illuminated at the prescribed power, as shown in FIG. 4B-(b), with the laser beam L, and the recording magnetic field Hr is applied in the prescribed direction and at the prescribed intensity to the zone where the coercive force Hc is reduced by heating induced by laser beam illumination in the recording magnetic film 42, as shown in FIG. 4B-(c). As a result, the prescribed signal is recorded as the changes in the magnetization direction in the user data area Y.

Then, as shown in FIG. 4B-(b), the laser beam illumination is stopped to avoid heating of the servo pattern area S located forward in the slider movement direction, when the zone in the track T that faces the laser beam emission section 51a comes to a position $P_2$. Even when no external magnetic field is applied, if the coercive force Hc of the servo pattern areas S is decreased by the increase in temperature, then the servo pattern (not shown in the figure), which has been formed magnetically in the servo pattern areas S, can change or degrade under he effect of thermal fluctuations. Furthermore, at the same time as the laser beam illumination has thus been stopped, as shown in FIG. 4B-(c), the recording magnetic field application is also stopped when the zone in the track T that faces the magnetic head 53 comes to a position $P_1$ located in front of position $P_2$. The distance from the position $P_1$ to the position $P_2$ corresponds to the distance from the magnetic head 53 in the slider 50 to the converging lens 52.

Then, as shown in FIG. 4B-(b), the laser beam illumination is started when the zone in the track T that faces the laser beam illumination section 51a comes to a position $P_3$ of a transition from the servo pattern area S to the user data area Y. Further, as shown in FIG. 4B-(c) the recording magnetic field application with the magnetic head 53 is started when the zone in the track T that faces the magnetic head 53 comes to a position $P_4$ in which the coercive force Hc is sufficiently reduced due to heating by the laser beam illumination. Writing of the user data is thus restarted.

In the track T, the servo pattern areas S are the recording prohibition areas where the recording of user data is prohibited, and the user data areas are the recording areas providing a field for recording the user data. However, with the above-described conventional thermally assisted magnetic recording method, as shown in FIG. 4B-(a), non-recording areas N1, N2 where the user data are not recorded though those areas are essentially contained in the recording areas are formed over a rather large total surface area in the user data areas Y on the boundary with the servo pattern areas S. Such a formation of the non-recording areas N1, N2 on a rather large total surface area is undesirable from the standpoint of increasing the recording capacity of the magnetic disk 40.

SUMMARY OF THE INVENTION

With the foregoing in view, it is an object of the present invention to provide a thermally assisted magnetic recording method suitable for increasing the recording capacity of a magnetic disk (magnetic recording medium).

According to a first aspect of the present invention, there is provided a thermally assisted magnetic recording method for a magnetic recording medium comprising a recording magnetic film which includes a recording area and a recording prohibition area adjacent to each other. The method comprises: locally heating the recording magnetic film located inside the recording area with heating means, while moving the heating means relative to and in opposition to the recording magnetic film; stopping the heating with the heating means as a zone in the recording magnetic film that faces the heating means transitions from the recording area to the recording prohibition area; recording a signal by applying locally a recording magnetic field to the recording magnetic film located inside the recording area with a magnetic field applier, while moving the magnetic field applier relative to and in opposition to the recording magnetic film in association with the heating means; and stopping the application of the recording magnetic field after stopping the heating, as the zone in the recording magnetic film that faces the magnetic field applier transitions from the recording area to the recording prohibition area.

With the present method, the heating of the recording magnetic film located in the recording area with the heating means is stopped at the prescribed timing (timing ensuring that the inappropriate heating of the recording prohibition area with the heating means is avoided) before the zone in the recording magnetic film that faces the heating means moves from the user data area to the servo pattern area. After the heating has been stopped, the magnetic field application is stopped at the prescribed timing before the coercive force in the aforementioned application zone reaches the intensity of the recording magnetic field locally applied to the recording magnetic film with the magnetic field application means. As a result, signals can be recorded in a wider range in the user data area Y than with the above-described conventional method by which the recording magnetic field application is stopped at the same time as the heating is stopped. Thus, with the present method, the non-recording area in which signals are not recorded, regardless of whether it is contained in the user data area, essentially can be reduced in size with respect to that of the above-described conventional method. Such a thermally assisted magnetic recording method is suitable for increasing the capacity of magnetic disk.

According to a second aspect of the present invention, there is provided a thermally assisted magnetic recording method for a magnetic recording medium comprising a recording magnetic film which includes a first recording area, a second recording area and a recording prohibition area disposed between and adjacent to these recording areas. The method comprises: locally heating the recording magnetic film located inside the first recording area with heating means, while moving the heating means relative to and in opposition to the recording magnetic film; weakening the heating with the heating means as a zone in the recording magnetic film that faces the heating means transitions from the first recording area to the recording prohibition area; intensifying the heating with the heating means as the zone in the recording magnetic film that faces the heating means transitions from the recording prohibition area to the second recording area; recording a signal by applying locally a recording magnetic field to the recording magnetic film located inside the first recording area with a magnetic field applier, while moving the magnetic field applier relative to and in opposition to the recording magnetic film, in association with the heating means; stopping the application of the recording magnetic field with the magnetic field applier as the zone in the recording magnetic film transitions from the first recording area to the recording prohibition area; and restarting the application of the recording magnetic field with the magnetic field applier as the zone in the recording magnetic film that faces the magnetic field applier from the recording prohibition area to the second recording area.

With the present method, the level of heating of the recording magnetic field located inside the recording area with the heating means is weakened and the recording prohibition area is also heated to the allowed level at the prescribed timing (timing allowing the excess heating of the recording prohibition area with the heating means to be avoided) before the zone in the recording magnetic film that faces the heating means makes a transition from the recording area to the recording prohibition area. As a result, the area in which the coercive force is equal to or higher than the recording magnetic field intensity in the recording prohibition area and vicinity thereof can be reduced with respect to that attained in the above-described conventional method in which the heating with the heating means is stopped when the heating means passed above the recording inhibition area. Thus, with the present method, signals can be recorded in a wider range in the recording area than with the above-described conventional method, and the non-recording area in which signals are not recorded, regardless of whether it is contained in the user data area, essentially can be reduced in size with respect to that of the above-described conventional method. Such a thermally assisted magnetic recording method is suitable for increasing the capacity of magnetic disk.

According to a third aspect of the present invention, there is provided a thermally assisted magnetic recording method for a magnetic recording medium comprising a recording magnetic film which includes a first recording area, a second recording area and a recording prohibition area disposed between and adjacent to these recording areas. The method comprises: locally heating the recording magnetic film located inside the first recording area with heating means at a first heating level, while moving the heating means relative to and in opposition to the recording magnetic film; stopping the heating with the heating means as a zone in the recording magnetic film that faces the heating means transitions from the first recording area to the recording prohibition area; locally heating the recording magnetic film located inside the second recording area with the heating means temporarily at a second heating level higher than the first heating level, the heating being performed as the zone in the recording magnetic film transitions from the recording prohibition area to the second recording area; weakening the heating with the heating means to the first heating level; recording a signal by applying locally a recording magnetic field to the recording magnetic film located inside the first recording area with a magnetic field applier, while moving the magnetic field applier relative to and in opposition to the recording magnetic film in association with the heating means; stopping the application of the recording magnetic field as the zone in the recording magnetic film transitions from the first recording area to the recording prohibition area; and restarting the application of the recording magnetic field with the magnetic field applier as the zone in the recording magnetic film transitions from the recording prohibition area to the second recording area.

With the present method, the recording magnetic film located in the recording area is heated at the second heating level, which is higher than the first heating level, prior to heating the recording magnetic film at the first heating level with the heating means, upon transition of the zone in the recording magnetic film that faces the heating means from the recording prohibition area to the recording area. As a result, the area in which the coercive force is equal to or higher than the recording magnetic field intensity in the recording prohibition area and vicinity thereof can be reduced with respect to that attained in the above-described conventional method in which the heating is restarted at a comparatively low heating level. Thus, with the present method, signals can be recorded in a wider range in the recording area than with the above-described conventional method, and the non-recording area in which signals are not recorded, regardless of whether it is contained in the user data area, essentially can be reduced in size with respect to that of the above-described conventional method. Such a thermally assisted magnetic recording method is suitable for increasing the capacity of magnetic disk.

BRIEF DESCRIPTION OF THE DRAWINGS

FIG. 1A is a sectional view showing a magnetic disk and a slider used for a thermally assisted magnetic recording method of the first embodiment of the present invention;

FIG. 1B illustrates a control mode of laser beam illumination with respect to a track of the disk;

DESCRIPTION OF THE PREFERRED EMBODIMENTS

Figure 2A:
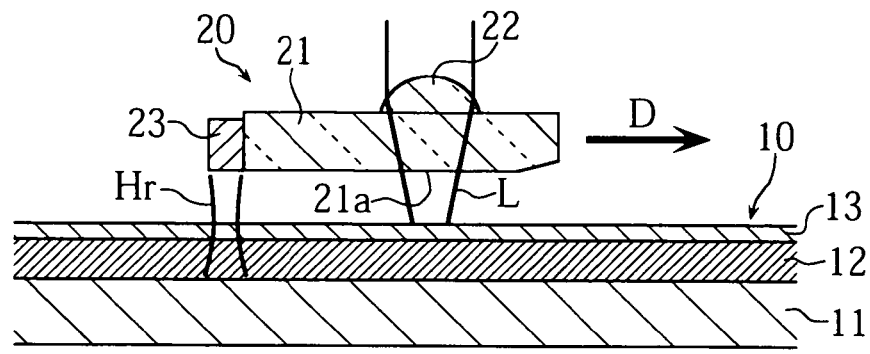
FIG. 2A is a sectional view showing a magnetic disk and a slider used for a thermally assisted magnetic recording method of the second embodiment of the present invention.

FIGS. 1A and 1B illustrate a thermally assisted magnetic recording method of a first embodiment of the present invention. FIG. 1A shows a partial cross-section of a magnetic disk 10 rotated during information recording and a slider 20 disposed opposite the magnetic disk. FIG. 1B illustrates a control mode of laser illumination with respect to a track of the disk 10 shown in FIG. 1A.

As shown in FIG. 1A, the magnetic disk 10 has a laminated structure comprising a disk substrate 11, a recording magnetic film 12, and a protective layer 13 and is composed as a magnetic recording medium capable of implementing information recording (magnetic recording) and information reproduction in a thermally assisted recording system. The disk substrate 11 is a component mainly designed to ensure the rigidity of the magnetic disk 10 and is, for example, an aluminum alloy substrate, a glass substrate, or a resin substrate. The recording magnetic film 12 is composed of a perpendicularly magnetized film or in-plane magnetized film and constitutes a recording surface for recording information in the magnetic disk 10. Such a recording magnetic film 12 is composed, for example, of a Co alloy, an Fe alloy, or an amorphous alloy of a rare earth transition metal. The protective layer 13 serves to protect chemically and physically the recording magnetic film 12 from the external fields. It is composed, for example, of SiN, $SiO_2$, or diamond-like carbon. Such a magnetic disk 10 is supported by a spindle motor (not shown in the figure) and rotated by a rotary drive from the spindle motor.

The slider 20 comprises a slider body 21, a converging lens 22, and a magnetic head 23 for recording. The slider body 21 comprises a prescribed laser emission section 21a on the side thereof facing the medium. A laser beam L that is emitted from a light source (not shown in the figures) and passed through the converging lens 22 can be emitted from the laser emission section 21a. The converging lens 22 is used to converge the laser beam L. The magnetic head 23 serves to apply the prescribed recording magnetic field to the recording magnetic film 12 and is composed of a coil for passing an electric current for magnetic field generation and a magnetic pole for converting the generated magnetic field into a strong magnetic field. Further, the slider 20 also may additionally comprise a magnetic head for reproduction which is designed for detecting magnetic signals originating in the magnetization state of the recording magnetic film 12 and converting them into electric signals. This magnetic head for reproduction is composed, for example, of a GMR element or MR element. Such a slider 20 is linked to an actuator (not shown in the figure) via a suspension arm (not shown in the figures) in the form of a plate spring. The actuator is composed, for example, of a bias coil motor. The movement direction of the slider 20 with respect to the rotating magnetic disk 10 is shown by arrow D.

FIG. 1B-(a) is a partial enlarged plan view of a track T in the recording magnetic film 12 (recording surface) and vicinity thereof (the scale in this figure is different from that in FIG. 1A). In the track T, user data areas Y and servo pattern areas S are disposed alternately in the extension direction thereof (that is, the circumferential direction of the magnetic disk 10).

FIG. 1B illustrates the control mode of laser beam illumination in the present embodiment. In the graph shown in FIG. 1B-(b), the position on the recording magnetic film 12 or track T (position in the track extension direction) opposite the laser beam emission section 21a located directly below the converging lens 22 is plotted against the abscissa, and the laser power is plotted against the ordinate. The laser power corresponding to the position in the track extension direction of the laser beam L illuminated on the recording magnetic film 12 is represented by a solid line 31.

FIG. 1B-(c) is a graph showing the control mode of recording magnetic field application and changes in the coercive force of the recording magnetic film 12 in the present embodiment. In the graph shown in FIG. 1B-(c), the position on the recording magnetic film 12 or track T (position in the track extension direction) opposite the magnetic head 23 is plotted against the abscissa, and the absolute value of the intensity of the recording magnetic field Hr and the coercive force Hc of the recording magnetic film 12 are plotted against the ordinate. The absolute value of the intensity corresponding to the position in the track extension direction is shown with a solid line 32 for the recording magnetic field Hr applied to the recording magnetic film 12 (therefore, the application direction of the recording magnetic field Hr is not represented by the solid line 32). Furthermore, the coercive force Hc of the recording magnetic film 12 at the time the magnetic head 23 passes by is represented by a dash-dot line 33.

In the thermally assisted magnetic recording method of the present embodiment, the prescribed user data are written by laser beam illumination and recording magnetic field application in the user data areas Y successively facing the slider 20 in a state (that is, in a state in which the magnetic disk 10 is rotated in the direction opposite that of arrow D after the slider 20 is disposed opposite the recording surface) in which the slider 20 is moved in the direction shown by arrow D with respect to the recording magnetic film 12 (recording surface), and the laser beam illumination and recording magnetic field application are stopped at the prescribed timing so that the servo pattern magnetically formed in the servo pattern areas S successively facing the slider 20 does not change.

When the user data are written into the user data areas Y (during information recording), first, the recording magnetic film 12 is illuminated at the prescribed power, as shown in FIG. 1B-(b), with the laser beam L, and the recording magnetic field Hr that is set to the prescribed intensity is applied in the prescribed direction to the zone where the coercive force Hc is reduced by the heating induced by laser beam illumination in the recording magnetic film 12, as shown in FIG. 1B-(c). Then, as shown in FIG. 1B-(b), correspondingly to the transition of the zone in the track T that faces the laser beam emission section 21a from the user data area Y to the servo pattern area S, the laser beam illumination is stopped to avoid heating of the servo pattern area S located forward in the slider movement direction, when the aforementioned facing zone comes to a position $P_1$ in front of the servo pattern area S. Further, after the laser beam illumination has thus been stopped, as shown in FIG. 1B-(c), the recording magnetic field application is stopped when the zone in the track T that faces the magnetic head 23 comes to a position $P_2$ in which the coercive force Hc of this facing zone attains the set intensity of the recording magnetic field Hr. Thus, the prescribed signal is recorded as the changes in the magnetization direction in the user data area Y.

Further, as shown in FIG. 1B-(b), the laser beam illumination is started when the zone in the track T that faces the laser beam illumination section 21a comes to a position $P_3$ of a transition from the servo pattern area S to the user data area Y. Further, as shown in FIG. 1B-(c) the recording magnetic field application with the magnetic head 23 is started when the zone in the track T that faces the magnetic head 23 comes to a position $P_4$ in which the coercive force Hc is sufficiently reduced due to heating by the laser beam illumination. Writing of the user data is thus restarted.

With the present method, the magnetic field application is stopped at the prescribed timing after the heating by laser beam illumination has been stopped. As a result, a signal can be recorded in a wider range in the user data area Y than in the above-described conventional method by which the recording magnetic field application is stopped at the same time as the heating is stopped. Thus, with the present method, the non-recording area N1 in which signals are not recorded, regardless of whether it is contained in the user data area Y, is essentially reduced in size with respect to that of the above-described conventional method. Such a thermally assisted magnetic recording method is suitable for increasing the capacity of magnetic disk 10.

Figure 2B:
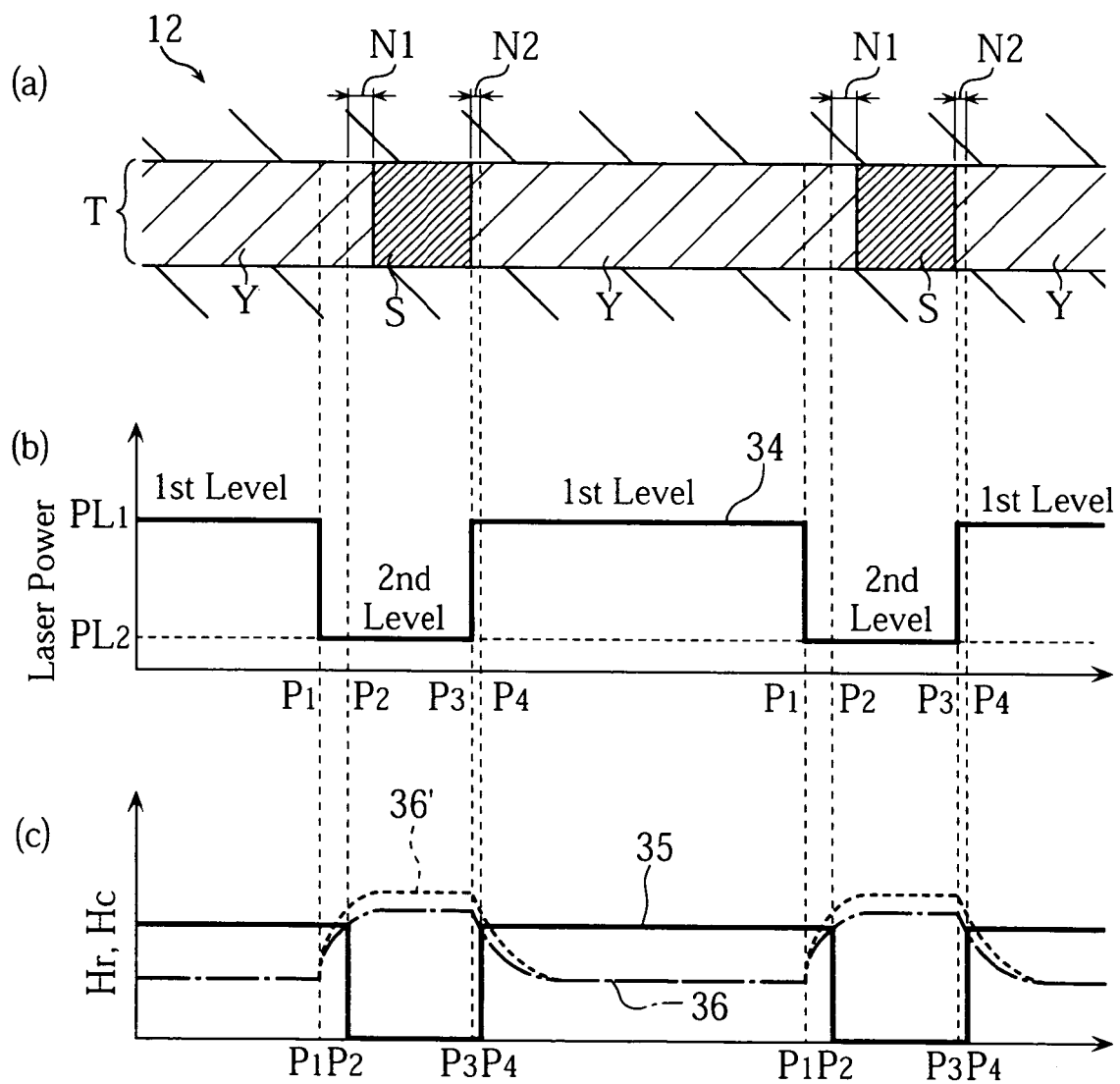
FIG. 2B illustrates a control mode of laser beam illumination with respect to a track of the disk.

FIGS. 2A–2B illustrate a thermally assisted magnetic recording method of the second embodiment of the present invention. FIG. 2A is identical to FIG. 1A. FIG. 2B-(a) is a partial enlarged plan view of a track T in the recording magnetic film 12 (recording surface) and vicinity thereof (the scale in this figure is different from that in FIG. 2A). In the track T, user data areas Y and servo pattern areas S are disposed alternately in the extension direction thereof (that is, circumferential direction of the magnetic disk 10). FIG. 2B-(b) is a graph illustrating the control mode of laser beam illumination in the present embodiment. In the graph shown in FIG. 2B-(b), the position on the recording magnetic film 12 or track T (position in the track extension direction) opposite the laser beam emission section 21a located directly below the converging lens 22 is plotted against the abscissa, and the laser power is plotted against the ordinate. The laser power corresponding to the position in the track extension direction of the laser beam L illuminated on the recording magnetic film 12 is represented by a solid line 34. FIG. 2B-(c) is a graph showing the control mode of recording magnetic field application and the changes in the coercive force of the recording magnetic film 12 in the present embodiment. In the graph shown in FIG. 2B-(c), the position on the recording magnetic film 12 or track T (position in the track extension direction) opposite the magnetic head 23 is plotted against the abscissa, and the absolute value of the intensity of the recording magnetic field Hr and the coercive force Hc of the recording magnetic film 12 are plotted against the ordinate. The absolute value of the intensity corresponding to the position in the track extension direction is shown with a solid line 35 for the recording magnetic field Hr applied to the recording magnetic film 12 (therefore, the application direction of the recording magnetic field Hr is not represented by the solid line 32). Furthermore, the coercive force Hc of the recording magnetic film 12 at the time the magnetic head 23 passes by is represented by a dash-dot line 36.

In the thermally assisted magnetic recording method of the present embodiment, the prescribed user data are written by laser beam illumination and recording magnetic field application in the user data areas Y successively facing the slider 20 in a state (that is, in a state in which the magnetic disk 10 is rotated in the direction opposite that of arrow D after the slider 20 is disposed opposite the recording surface) in which the slider 20 is moved in the direction shown by arrow D with respect to the recording magnetic film 12 (recording surface), and the laser beam illumination is changed at the prescribed timing and the recording magnetic field application is stopped at the prescribed timing so that the servo pattern magnetically formed in the servo pattern areas S successively facing the slider 20 does not change.

When the user data are written into the user data areas Y (during information recording), first, the recording magnetic film 12 is illuminated at the first power level $PL_1$, as shown in FIG. 2B-(b), with the laser beam L, and the recording magnetic field Hr that is set to the prescribed intensity is applied in the prescribed direction to the zone where the coercive force Hc is reduced by the heating induced by laser beam illumination at the first heating level in the recording magnetic film 12, as shown in FIG. 2B-(c) (the magnetic field application direction is not shown in FIG. 2B-(c)). Then, as shown in FIG. 2B-(b), correspondingly to the transition of the zone in the track T that faces the laser beam emission section 21a from the user data area Y to the servo pattern area S, the laser power is reduced to a prescribed second power level $PL_2$, which is lower than the first power level $PL_1$, to avoid inappropriate heating of the servo pattern area S located forward in the slider movement direction, when the aforementioned facing zone comes to a position $P_1$ in front of the servo pattern area S. As a result, the heating by laser beam illumination is reduced to the prescribed second heating level which is lower than the first heating level. Further, after the laser power has thus been reduced, as shown in FIG. 2B-(c), the recording magnetic field application is stopped when the zone in the track T that faces the magnetic head 23 comes to a position $P_2$ in which the coercive force Hc of this facing zone attains the set intensity of the recording magnetic field Hr. Thus, the prescribed signal is recorded as the changes in the magnetization direction in the user data area Y.

Further, as shown in FIG. 2B-(b), the laser power is again increased to the first power level $PL_1$ and the heating by laser beam illumination is again intensified to the first heating level when the zone in the track T that faces the laser beam illumination section 21a comes to a position $P_3$ of a transition from the servo pattern area S to the user data area Y. Further, as shown in FIG. 2B-(c) the recording magnetic field application with the magnetic head 23 is started when the zone in the track T that faces the magnetic head 23 comes to a position $P_4$ in which the coercive force Hc is sufficiently reduced due to heating by the laser beam illumination. Writing of the user data is thus restarted.

With the present method, the magnetic field application is stopped at the prescribed timing after the heating by laser beam illumination has been weakened from the first heating level to the second heating level. As a result, as described hereinabove with reference to the first embodiment, the non-recording area N1 is reduced in size with respect to that of the above-described conventional method. In addition, the area in which the coercive force Hc is equal to or higher than the set intensity of the recording magnetic field Hr in the servo pattern area S and vicinity thereof can be decreased by comparison with that of the above-described conventional method, in which laser beam illumination of the servo pattern area S is stopped, by reducing the level of heating of the recording magnetic film 12 by the laser beam illumination from the first heating level to the second heating level at the prescribed timing before the zone in the track T that faces the laser beam emission section 21a moves from the user data area Y to the servo pattern area S and by heating the servo pattern area S to the allowed level (second heating level). In FIG. 2B-(c), the coercive force Hc of the recording magnetic film 12 at the time the magnetic head 23 passes thereby is represented by a dotted line 36 with respect to the case where the laser beam illumination (first laser power $PL_1$) is tentatively stopped when the zone in the track T that faces the laser emission section 21a comes to the position $P_1$ and then the laser beam illumination (first laser powder $PL_1$) is restarted when the opposing zone comes to the position P3. With respect to this case, with the method of the present embodiment, the position in which the coercive force Hc of the recording magnetic film 12 increases due to temperature decrease and reaches the set intensity of the recording magnetic field Hr is closer to the servo pattern area S and the position in which the coercive force Hc of the recording magnetic film 12 decreases due to temperature decrease and reaches the set intensity of the recording magnetic field Hr is closer to the servo pattern area S. Therefore, with the present method, signals can be recorded within a wider range in the user data area Y than with the above-described conventional method and the non-recording areas N1, N2 in which signals are not recorded, regardless of whether they are contained in the user data area Y, essentially can be reduced in size. Such a thermally assisted magnetic recording method is suitable for increasing the capacity of magnetic disk 10.

Figure 3A:
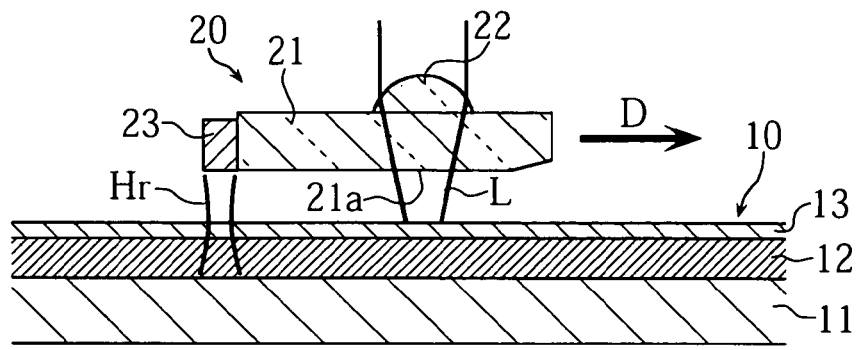
FIG. 3A is a sectional view showing a magnetic disk and a slider used for a thermally assisted magnetic recording method of the third embodiment of the present invention.
Figure 3B:
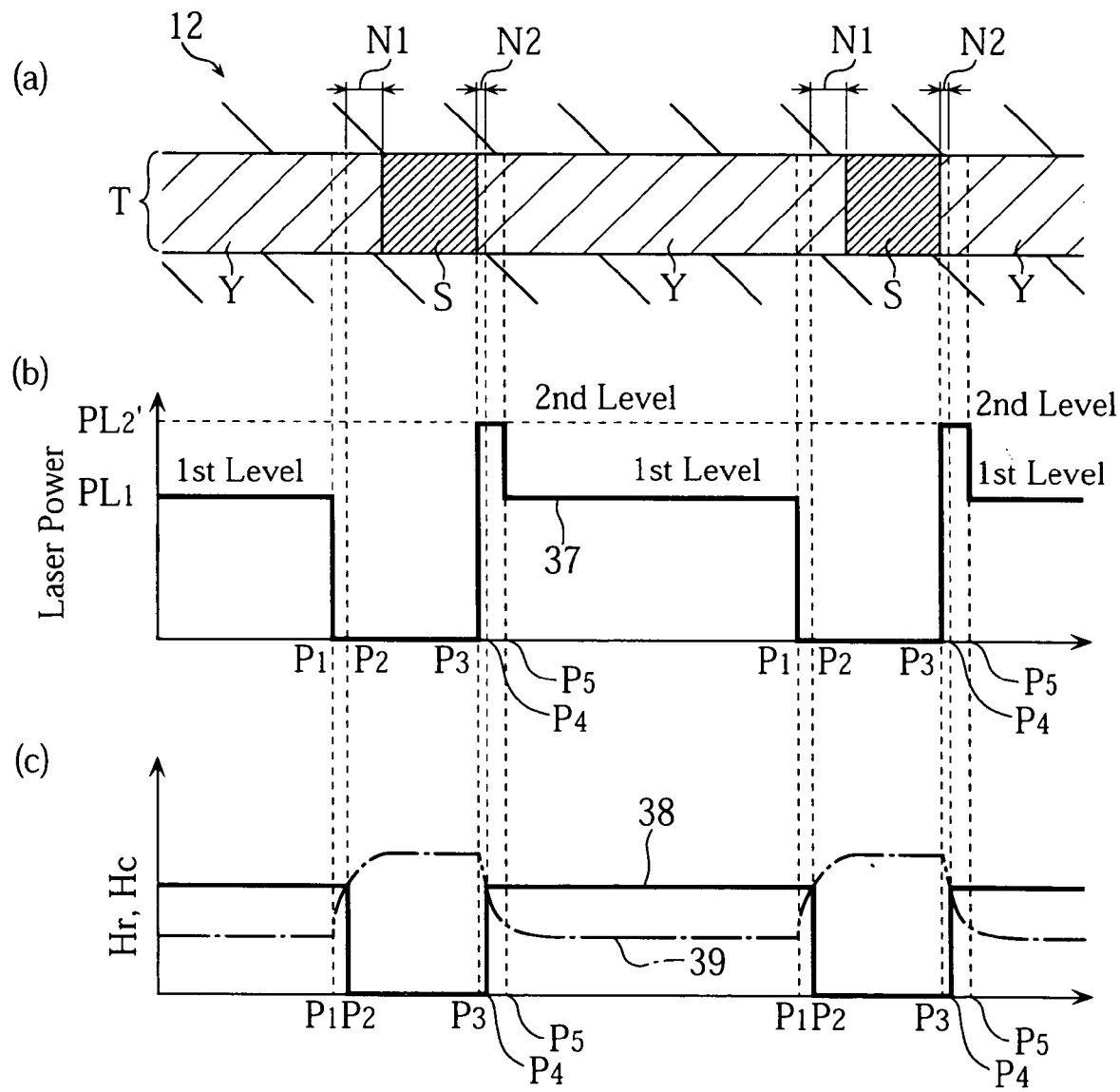
FIG. 3B illustrates a control mode of laser beam illumination with respect to a track of the disk.
Figure 4A:
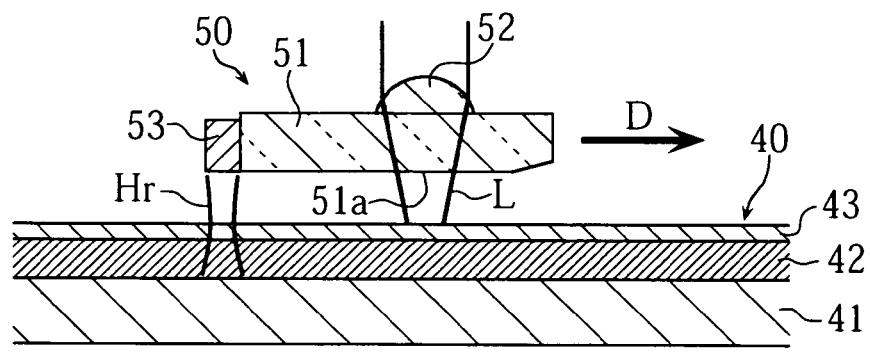
FIG. 4A is a sectional view showing a magnetic head and a slider used for a thermally assisted magnetic recording method of the prior art.
Figure 4B:
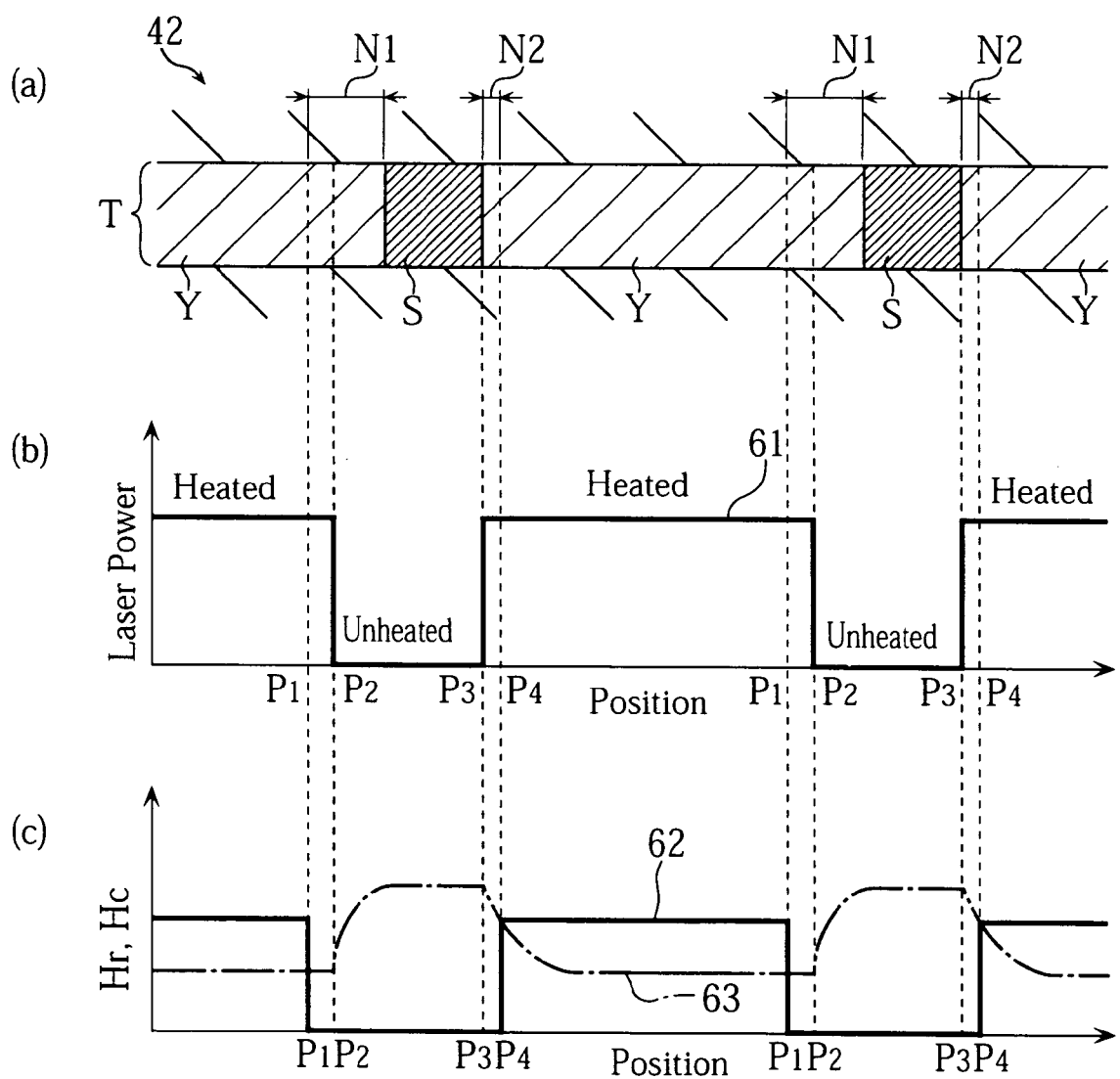
FIG. 4B illustrates a conventional control mode of laser beam illumination with respect to a track of the disk.

FIGS. 3A–3B illustrate a thermally assisted magnetic recording method of the third embodiment of the present invention. FIG. 3A is identical to FIG. 1A. FIG. 3B-(a) is a partial enlarged plan view of a track T in the recording magnetic film 13 (recording surface) and vicinity thereof (the scale in this figure is different from that in FIG. 3A). In the track T, user data areas Y and servo pattern areas S are disposed alternately in the extension direction thereof (that is, circumferential direction of the magnetic disk 10). FIG. 3B-(b) is a graph illustrating the control mode of laser beam illumination in the present embodiment. In the graph shown in FIG. 3B-(b), the position on the recording magnetic film 12 or track T (position in the track extension direction) opposite the laser beam emission section 21a located directly below the converging lens 22 is plotted against the abscissa, and the laser power is plotted against the ordinate. The laser power corresponding to the position in the track extension direction of the laser beam L illuminated on the recording magnetic film 13 is represented by a solid line 37. FIG. 3B-(c) is a graph showing the control mode of recording magnetic field application and the changes in the coercive force of the recording magnetic film 12 in the present embodiment. In the graph shown in FIG. 3B-(c), the position on the recording magnetic film 12 or track T (position in the track extension direction) opposite the magnetic head 23 is plotted against the abscissa, and the absolute value of the intensity of the recording magnetic field Hr and the coercive force Hc of the recording magnetic film 12 are plotted against the ordinate. The absolute value of the intensity corresponding to the position in the track extension direction is shown with a solid line 38 for the recording magnetic field Hr applied to the recording magnetic film 13 (therefore, the application direction of the recording magnetic field Hr is not represented by the solid line 38). Furthermore, the coercive force Hc of the recording magnetic film 13 at the time the magnetic head 23 passes by is represented by a dash-dot line 39.

In the thermally assisted magnetic recording method of the present embodiment, the prescribed user data are written by laser beam illumination and recording magnetic field application in the user data areas Y successively facing the slider 20 in a state (that is, in a state in which the magnetic disk 10 is rotated in the direction opposite that of arrow D after the slider 20 is disposed opposite the recording surface) in which the slider 20 is moved in the direction shown by arrow D with respect to the recording magnetic film 12 (recording surface), and the laser beam illumination and the recording magnetic field application are changed at the prescribed timing so that the servo pattern magnetically formed in the servo pattern areas S successively facing the slider 20 does not change.

When the user data are written into the user data areas Y, first, the recording magnetic film 12 is illuminated at the first power level $PL_1$, as shown in FIG. 3B-(b), with the laser beam L, and the recording magnetic field Hr that is set to the prescribed intensity is applied in the prescribed direction to the zone where the coercive force Hc is reduced by heating induced by laser beam illumination at the first heating level in the recording magnetic film 13, as shown in FIG. 3B-(c). Then, as shown in FIG. 3B-(b), correspondingly to the transition of the zone in the track T that faces the laser beam emission section 21a from the user data area Y to the servo pattern area S, the laser beam illumination is stopped to avoid heating of the servo pattern area S located forward in the slider movement direction, when the aforementioned facing zone comes to a position $P_1$ in front of the servo pattern area S. Further, after the laser beam illumination has thus been stopped, as shown in FIG. 3B-(c), the recording magnetic field application is stopped when the zone in the track T that faces the magnetic head 23 comes to a position $P_3$ in which the coercive force Hc of this facing zone attains the set intensity of the recording magnetic field Hr. Thus, the prescribed signal is recorded as the changes in the magnetization direction in the user data area Y.

Further, as shown in FIG. 3B-(b), the laser beam illumination is started at the prescribed second power level $PL_2'$, which is higher than the first power level $PL_1$, when the zone in the track T that faces the laser beam illumination section 21a comes to a position $P_3$ of a transition from the servo pattern area S to the user data area Y. As a result, heating of the recording magnetic film 12 is started at a second heating level which is higher than the first heating level. Further, as shown in FIG. 3B-(c) the recording magnetic field application with the magnetic head 23 is started when the zone in the track T that faces the magnetic head 23 comes to a position $P_4$ in which the coercive force Hc is sufficiently reduced due to heating by the laser beam illumination. Writing of the user data is thus restarted.

Then, the heating with the laser beam illumination is decreased from the second heating level to the first heating level by reducing the laser power from the second power level $PL_2'$ to the first power level $PL_1$ when the zone in the track T that faces the magnetic head 23 comes to a prescribed position $P_5$, as shown in FIG. 3B-(b), in order to avoid the excess increase in temperature of the recording magnetic film 12, and the writing of the user data in the user data area Y is continued.

With the present method, the magnetic field application is stopped at the prescribed timing after the heating by laser beam illumination has been stopped. As a result, as described hereinabove with reference to the first embodiment, the non-recording area N1 can be reduced in size with respect to that of the above-described conventional method. In addition, with the present method, the area in which the coercive force Hc is equal to or higher than the set intensity of the recording magnetic field Hr in the servo pattern area S and vicinity thereof can be decreased by comparison with that of the above-described conventional method, in which heating is conducted only at a comparatively low heating level, by heating the recording magnetic film 12 located inside the user data area Y at a second heating level which is higher than the first heating level before the recording magnetic film 12 located inside the user data area Y is heated at the first heating level by the laser beam illumination, correspondingly to the transition of the zone in the track T that faces the laser beam emission section 11a from the servo pattern area S to the user data area Y. This is because, with the method of the present embodiment, the position in which the coercive force Hc of the recording magnetic film 12 decreases due to the increase in temperature and reaches the set intensity of the recording magnetic field Hr is closer to the servo pattern area S than in the above-described conventional method. Therefore, with the present method, signals can be recorded within a wider range in the user data area Y than with the above-described conventional method and the non-recording area N2 in which signals are not recorded, regardless of whether it is contained in the user data area Y, essentially can be reduced in size. Such a thermally assisted magnetic recording method is suitable for increasing the capacity of magnetic disk 10.

In the present embodiment, instead of stopping the laser beam illumination correspondingly to the servo pattern area S, the laser beam illumination may be weakened correspondingly to the servo pattern area S, as in the second embodiment. Employing such a configuration makes it possible to obtain in this embodiment the effect of reducing the non-recording areas N1, N2 that is explained in the second embodiment.

The invention claimed is:

1. A thermally assisted magnetic recording method for a magnetic recording medium comprising a recording magnetic film which includes a recording area and a recording prohibition area adjacent to each other, the method comprising:

locally heating the recording magnetic film located inside the recording area with heating means, while moving the heating means relative to and in opposition to the recording magnetic film;

stopping the heating with the heating means as a zone in the recording magnetic film that faces the heating means transitions from the recording area to the recording prohibition area;

recording a signal by applying locally a recording magnetic field to the recording magnetic film located inside the recording area with a magnetic field applier, while moving the magnetic field applier relative to and in opposition to the recording magnetic film in association with the heating means; and stopping the application of the recording magnetic field after stopping the heating, as the zone in the recording magnetic film that faces the magnetic field applier transitions from the recording area to the recording prohibition area.

2. A thermally assisted magnetic recording method for a magnetic recording medium comprising a recording magnetic film which includes a first recording area, a second recording area and a recording prohibition area disposed between and adjacent to these recording areas, the method comprising:

locally heating the recording magnetic film located inside the first recording area with heating means, while moving the heating means relative to and in opposition to the recording magnetic film;

weakening the heating with the heating means as a zone in the recording magnetic film that faces the heating means transitions from the first recording area to the recording prohibition area;

intensifying the heating with the heating means as the zone in the recording magnetic film that faces the heating means transitions from the recording prohibition area to the second recording area;

recording a signal by applying locally a recording magnetic field to the recording magnetic film located inside the first recording area with a magnetic field applier, while moving the magnetic field applier relative to and in opposition to the recording magnetic film, in association with the heating means;

stopping the application of the recording magnetic field with the magnetic field applier as the zone in the recording magnetic film transitions from the first recording area to the recording prohibition area; and restarting the application of the recording magnetic field with the magnetic field applier as the zone in the recording magnetic film that faces the magnetic field applier from the recording prohibition area to the second recording area.

3. A thermally assisted magnetic recording method for a magnetic recording medium comprising a recording magnetic film which includes a first recording area, a second recording area and a recording prohibition area disposed between and adjacent to these recording areas, the method comprising:

locally heating the recording magnetic film located inside the first recording area with heating means at a first heating level, while moving the heating means relative to and in opposition to the recording magnetic film;

stopping the heating with the heating means as a zone in the recording magnetic film that faces the heating means transitions from the first recording area to the recording prohibition area;

locally heating the recording magnetic film located inside the second recording area with the heating means temporarily at a second heating level higher than the first heating level, the heating being performed as the zone in the recording magnetic film transitions from the recording prohibition area to the second recording area;

weakening the heating with the heating means to the first heating level;

recording a signal by applying locally a recording magnetic field to the recording magnetic film located inside the first recording area with a magnetic field applier, while moving the magnetic field applier relative to and in opposition to the recording magnetic film in association with the heating means;

stopping the application of the recording magnetic field as the zone in the recording magnetic film transitions from the first recording area to the recording prohibition area; and restarting the application of the recording magnetic field with the magnetic field applier as the zone in the recording magnetic film transitions from the recording prohibition area to the second recording area.

* * * * *